United States Patent
Min et al.

(10) Patent No.: US 6,762,571 B2
(45) Date of Patent: Jul. 13, 2004

(54) SINUSOIDAL FEED-FORWARD SEEK WITH ADAPTIVE ACOUSTIC LEVEL CONSTRAINT

(75) Inventors: ShuangQuan Min, Singapore (SG); MingZhong Ding, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/143,025

(22) Filed: May 10, 2002

(65) Prior Publication Data

US 2003/0057900 A1 Mar. 27, 2003

Related U.S. Application Data

(60) Provisional application No. 60/323,935, filed on Sep. 21, 2001.

(51) Int. Cl.[7] .................................................. H02K 41/00
(52) U.S. Cl. .................... 318/135; 360/78.07; 360/78.04; 318/560
(58) Field of Search ..................... 318/460, 611, 318/629, 135, 126, 127, 128, 129, 560; 360/78.04, 78.05, 78.06, 78.07, 78.09, 78.14, 77.04, 77.05; 310/12, 13, 14

(56) References Cited

U.S. PATENT DOCUMENTS

| | | | |
|---|---|---|---|
| 4,918,364 A | * 4/1990 | Naito | 318/646 |
| 5,151,639 A | 9/1992 | Hasegawa et al. | 318/568.18 |
| 5,465,034 A | 11/1995 | Andrews, Jr. et al. | 318/560 |
| 5,475,545 A | 12/1995 | Hampshire et al. | 360/78.06 |
| 5,696,647 A | 12/1997 | Phan et al. | 360/78.07 |
| 5,901,009 A | 5/1999 | Sri-Jayantha et al. | 360/78.07 |
| 5,936,792 A | * 8/1999 | Kobayashi et al. | 360/78.07 |
| 6,013,995 A | * 1/2000 | Kim | 318/561 |
| 6,016,043 A | * 1/2000 | Motzko et al. | 318/606 |
| 6,140,791 A | * 10/2000 | Zhang | 318/632 |
| 6,144,176 A | * 11/2000 | Quinlan | 318/460 |
| 6,204,621 B1 | * 3/2001 | Gotou | 318/599 |
| 6,259,224 B1 | * 7/2001 | Smith et al. | 318/629 |
| 6,501,242 B1 | * 12/2002 | Erickson et al. | 318/560 |
| 6,566,827 B2 | * 5/2003 | Gotou et al. | 318/254 |
| 6,570,357 B2 | * 5/2003 | Gotou | 318/599 |
| 6,624,964 B1 | * 9/2003 | Pirzadeh | 360/78.07 |
| 2002/0006010 A1 | 1/2002 | Ding et al. | 360/78.06 |

* cited by examiner

*Primary Examiner*—Thanh Lam
*Assistant Examiner*—Judson H. Jones
(74) *Attorney, Agent, or Firm*—David K. Lucente; Derek J. Berger (57) ABSTRACT

A method and apparatus for controlling acoustic noise generated by a seek operation in a disc drive by using a feedback control system to control the seek operation. The feedback control system is excited by a feed-forward signal during execution of the seek operation. An acoustic factor, which defines a seek operation noise level, is selected. The feed-forward signal is generated based, at least in part, upon the selected acoustic factor. The feed-forward signal has a first derivative having a maximum value. The selected acoustic factor is used to select the maximum value of the first derivative of the feed-forward signal.

11 Claims, 5 Drawing Sheets

SINUSOIDAL FEED-FORWARD SEEK WITH ADAPTIVE ACOUSTIC LEVEL CONSTRAINT

RELATED APPLICATIONS

This application claims priority of U.S. provisional application Serial No. 60/323,935, filed Sep. 21, 2001 and entitled "SINE FEED FORWARD SEEK WITH ADAPTIVE LEVEL CONSTRAINT."

FIELD OF THE INVENTION

This application relates generally to an apparatus and method for exciting a servo control system in a disc drive with a feed-forward signal with a constrained maximum derivative and more particularly to a method and apparatus for exciting a servo control system with a sinusoidal feed-forward signal.

BACKGROUND OF THE INVENTION

The storage medium for a disc drive is a flat, circular disc capable of retaining localized magnetic fields. The data stored upon the disc find physical representation through these localized magnetic fields. The data are arranged on the disc in concentric, circular paths known as tracks. The localized magnetic fields can be detected by a magnetically sensitive head when the field is brought in close proximity to the head.

The head is mounted upon an actuator arm that is rotated by a servomotor. Accordingly, the track position of the head is controlled by the servomotor. When the head needs to access a different track, the actuator arm is rotated, bringing the head to the desired track position. The process of moving the head to a new track, referred to as seeking, includes an acceleration and a deceleration phase, and the period during which seeking occurs is known as the access time.

In some disc drives, seek operations are controlled by a feedback loop, which may be excited by a feed-forward control signal. In such a disc drive, the control process typically works as follows. During the acceleration phase of the seek operation, a feed-forward signal is used to excite the servo system, resulting in the head being accelerated along a circular arc. While the head is experiencing acceleration, its velocity and position are periodically measured, and these measurements are compared against desired or "target" velocity and position values. The differences between the measured values and the target values are subsequently used to adjust a current that drives the servomotor.

During deceleration, a negative feed-forward signal is used to excite the servo system, resulting in the head being decelerated. Once again, while the head is decelerated, its velocity and position are periodically measured, and these measurements are compared against target velocity and position values. Again, the differences between the measured values and the target values are used to subsequently adjust the current that drives the servomotor.

One particular drawback of the above-described seek operation is that it results in a trade off between the seek performance of a disc drive and its acoustic qualities. Reducing access times results in a noisier disc drive, and vice versa. This trade-off is viewed differently by different sorts of disc drive users. For example, within the realm of consumer electronics, most users are willing to sacrifice seek performance in favor of acoustic silence. On the other hand, other customers may prefer enhanced seek performance, even at the expense of disc drive acoustics. As a consequence, some disc drives permit an "acoustic factor" to be set. The acoustic factor allows the balance between seek performance and drive acoustics to be selected.

Several attempts have been made to adjust the acoustic quality of a disc drive based upon an "acoustic factor." These attempts have typically shared one or more of the following shortcomings: the noise control technique is ineffective for long seeks; the noise control technique is ineffective for short seeks; acoustic noise is generated during periods of transition between acceleration and deceleration of the head; or, the noise control technique dramatically affects drive performance.

As is made evident from the foregoing discussion, there exists a need for a scheme by which an acoustic factor may be used to determine the tradeoff between seek performance and drive acoustics. A successful scheme will be implementable for short seeks, and will require little additional hardware.

SUMMARY OF THE INVENTION

Against this backdrop the present embodiments have been developed. A method of controlling acoustic noise generated by a seek operation in a disc drive may be realized by using a feedback control system to control the seek operation. The feedback control system is excited by a feed-forward signal during execution of the seek operation. Next, an acoustic factor, which defines a seek operation noise level, is selected. Thereafter, the feed-forward signal is generated based, at least in part, upon the selected acoustic factor. (The feed-forward signal has a first derivative having a maximum value.) The selected acoustic factor is used to select the maximum value of the first derivative of the feed-forward signal.

According to another embodiment, a disc drive may include a magnetically encodable disc for storing data on data tracks written on the disc. Further, it may include a magnetically sensitive transducer for reading data from the disc. The magnetically sensitive transducer is carried by an actuator arm that moves the transducer between data tracks. Also, a motor is attached to the actuator arm for propelling the actuator arm when driven with an electrical current. Finally, a microprocessor programmed to execute a feedback control loop to control a seek operation. The feedback control loop is driven by a feed-forward numeric sequence during execution of the seek operation. The feedback control loop has a numeric output that is converted into the electrical current that drives the servo motor, thereby propelling the actuator arm. The feed-forward numeric sequence is generated, based at least in part upon an acoustic factor, defining a noise level of the seek operation. (The feed-forward numeric sequence has a first derivative having a maximum value.) The acoustic factor determines the maximum value of the first derivative of the feed-forward numeric sequence.

According to another embodiment, a disc drive includes a servomotor for propelling an actuator arm during a seek operation. The disc drive also includes a means for determining a noise level of a seek operation, based upon an acoustic factor limiting a derivative of a feed-forward control signal.

These and various other features as well as advantages which characterize the present invention will be apparent from a reading of the following detailed description and a review of the associated drawings.

DETAILED DESCRIPTION

The acoustic quality of a disc drive may be made dependent upon a selectable acoustic factor in the following manner. Seek operations are controlled by a feedback loop that is driven by a feed-forward control signal. Informed with the insight that acoustic noise in a disc drive is related to the first derivative of the current supplied to the servomotor, the acoustic factor is used to set a limit on the first derivative of the feed-forward signal.

The feed-forward control signal may be composed of one full period of a sinusoid (the positive-going portion of the sinusoid corresponds to head acceleration, while the negative-going portion corresponds to head deceleration). To define the sinusoid, the amplitude and period of the sinusoid should be known. The amplitude and period may be determined based upon the length of the seek operation to be performed and the selected acoustic factor. The amplitude and period of sinusoid are chosen so that the first derivative of the sinusoid does not exceed a limit determined by the acoustic factor. Consequently, the acoustic noise of the disc drive is limited by the acoustic factor.

Figure 1:
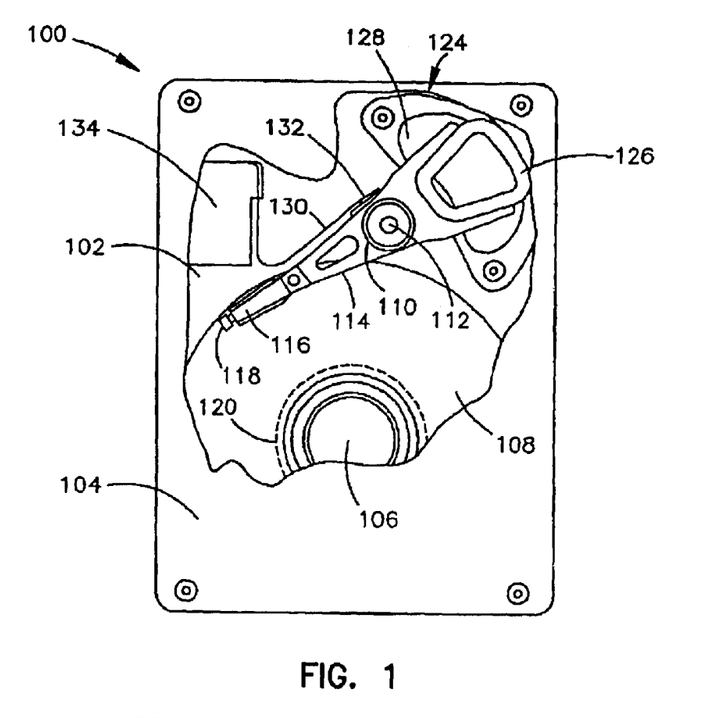
FIG. 1 is a schematic representation of a disc drive in accordance with a preferred embodiment of the invention.
Figure 2:
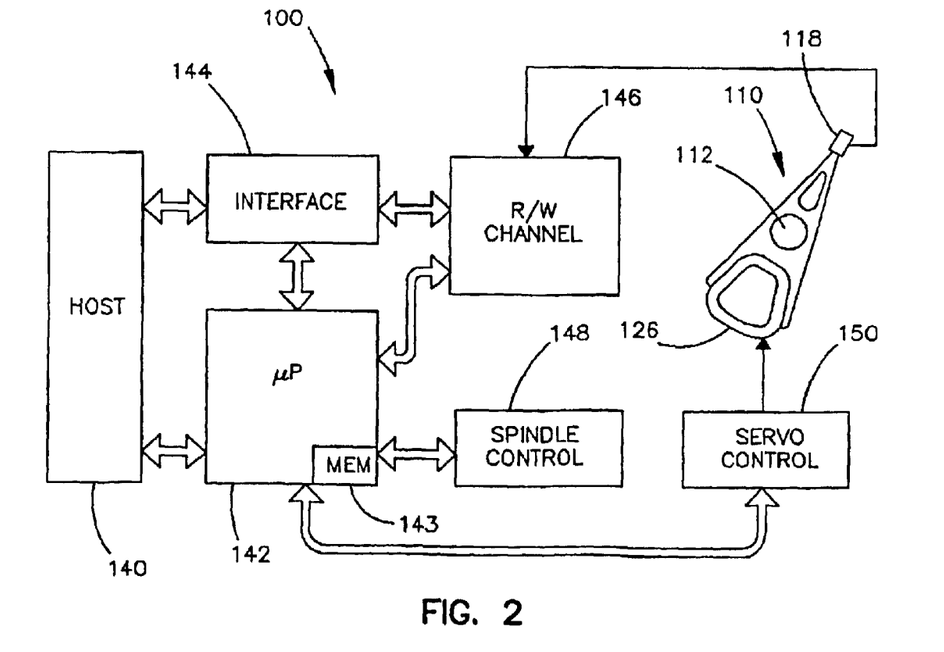
FIG. 2 illustrates a disc drive system connected to a host for the disc drive of FIG. 1.

In the following disclosure, the discussion related to FIGS. 1 and 2 is intended primarily to familiarize the reader with a disc drive in a general manner. The discussion related to FIGS. 3–5 focusses more closely upon the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. The noise generated by a seek operation is related to the first derivative of the current driven through the coil 126. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, of the plant to generate the response of the servomechanism to a feed-forward control signal.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Figure 3:
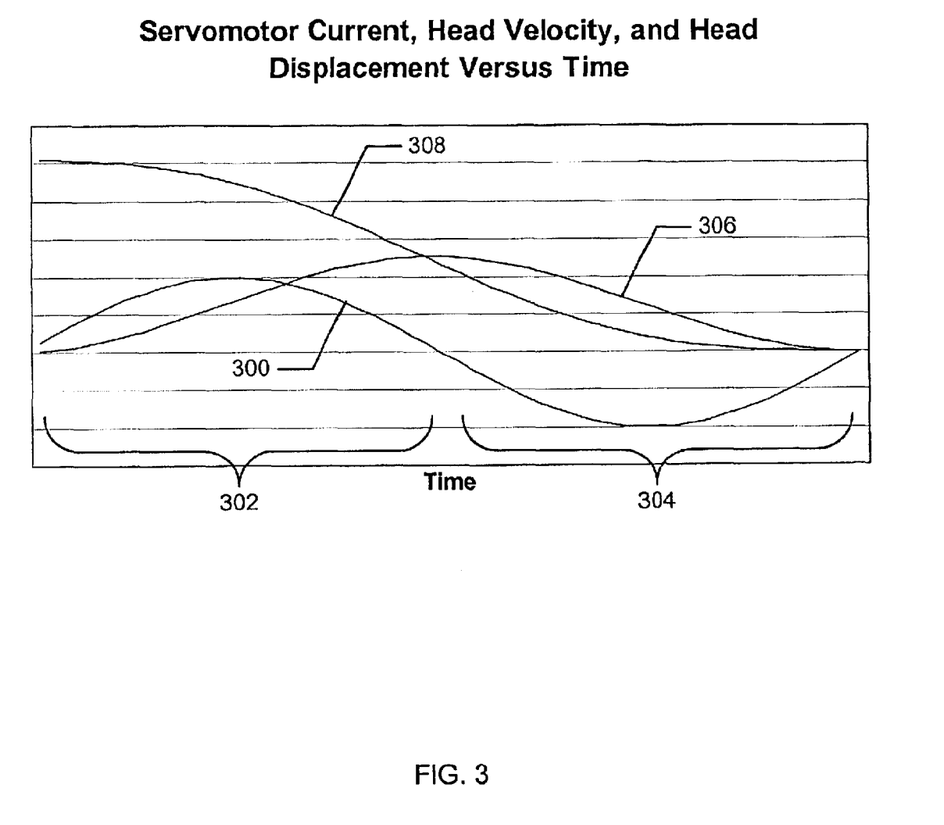
FIG. 3 depicts a sinusoidal current used to drive the coil during a seek operation, in accordance with an embodiment of the present invetion.

FIG. 3 depicts a sinusoidal current 300 used to drive the coil 126 during a seek operation. As can be seen from FIG. 3, the sinusoid 300 has a positive-going portion 302 and a negative-going portion 304. The acceleration experienced by the actuator arm 114 during a seek operation is approximately proportional to the current driven through the coil 126. Thus, while the coil 126 is driven with the positive-going portion 302 of the sinusoid 300, the actuator arm 114 is accelerated. Conversely, while the coil 126 is driven with the negative-going portion 304 of the sinusoid 300, the actuator arm 114 is decelerated. Accordingly, during a seek operation, the actuator arm 114 undergoes a period of acceleration followed by a period of deceleration.

Expressed mathematically, the current 300 is described by the following equation:

$$i(t)=A\sin(2\pi t/t_f) \quad (1)$$

where i(t) represents the current 300 driven through the coil 126 (expressed as a function of time), A represents the ampltiude of the sinusoid 300, t represents time, and $t_f$ represents the period of the sinusoid 300. As stated previously, the current driven through the coil 126 is proportional to the acceleration experienced by the actuator arm 114. Therefore, the velocity of the actuator arm 114 is proportional to:

$$v(t) \propto \int i(t)dt = \int A\sin(2\pi t/t_f)dt = (At_f/2\pi)[1-\sin(2\pi(t/t_f+\frac{1}{4}))] \quad (2)$$

Head velocity, v(t), is depicted by line 306. Notably, at time t=0, head velocity begins a 0 meters per second, and at time t=$t_f$, head velocity returns to 0 meters per second. Hence, when driven with such a current, the head will accelerate, decelerate, and then come to rest over its target track after traveling for a period of time t=$t_f$.

Expressed mathematically, head displacement, x(t), equals:

$$x(t)=\int v(t)dt \propto (At_f/2\pi)t-(At_f^2/4\pi^2)\sin(2\pi t/t_f) \quad (3)$$

At time t=$t_f$, one full period of the sinusoid 300 has elapsed, and the actuator arm 114 has traveled its full course, meaning that the attached head has once again come to rest. Seek length, X, is proportional to:

$$X=\text{seek length}=x(t_f) \propto At_f^2/2\pi \quad (4)$$

Therefore, assuming that the servomotor 126 and the actuator arm 114 behaves ideally in response to being excited by the sinusoid 300, the expected response of the head is proportional to x(t) and v(t), as described above. The desired or expected velocity and position values are referred to as "trajectories." Thus, v(t) is referred to as the "velocity trajectory." "Position trajectory," however, is conventionally described in terms of how far the head is from its target track (rather than how far the head has moved from its track of origination). Position trajectory, $x_{traj}(t)$, equals:

$$X_{traj}(t)=At_f^2/2\pi-x(t)=At_f^2/2\pi-(At_f/2\pi)t+(At_f^2/4\pi^2)\sin(2\pi t/t_f) \quad (5)$$

As stated earlier, the noise level of a seek operation is related to the first derivitive of the current used to drive the servomotor 126. Thus, by setting the maximum value of the first derivitive of the current, i(t), to a constant, C, the noise level of a seek operation is limited by the variable C, which may be referred to as an "acoustic factor." Accordingly, the maximum value of the first derivative of i(t) equals:

$$C=\max[d/dt(A\sin(2\pi t/t_f)]=2\pi A/t_f \quad (6)$$

The above equation may be restated to define the amplitude of the sinusoid, A, in terms of the acoustic factor, C:

$$A=Ct_f/2\pi \quad (7)$$

Similarly, the period of the sinusoid 300 may be deduced from equation 4 and 7. In terms of the seek length, X, and the acoustic factor, C, the period is:

$$t_f=(X/C)^{1/3}*(2\pi)^{2/3} \quad (8)$$

Therefore, a sinusoid 300, with an amplitude $A=Ct_f/2\pi$ and a period $t_f=(X/C)^{1/3}*(2\pi)^{2/3}$ has a maximum first derivative C.

To summarize the insights realized by the above-stated mathematics, it should be noted that an acoustic factor, C can be used to limit the first derivative of a sinusoidal feed-forward control signal (see equation 6). Based upon the acoustic factor, C, and a desired seek length, X, an amplitude, A, and period, $t_f$, of the sinusoidal feed-forward control signal may be determined (see equations 7 and 8, respectively). Thus, a feed-forward control signal may be generated which functions to drive the head 118 to its target track, while at the same time having its first derivative bounded by the acoustic factor, C (meaning that the acoustic noise of the seek operation is also bounded).

Figure 4:
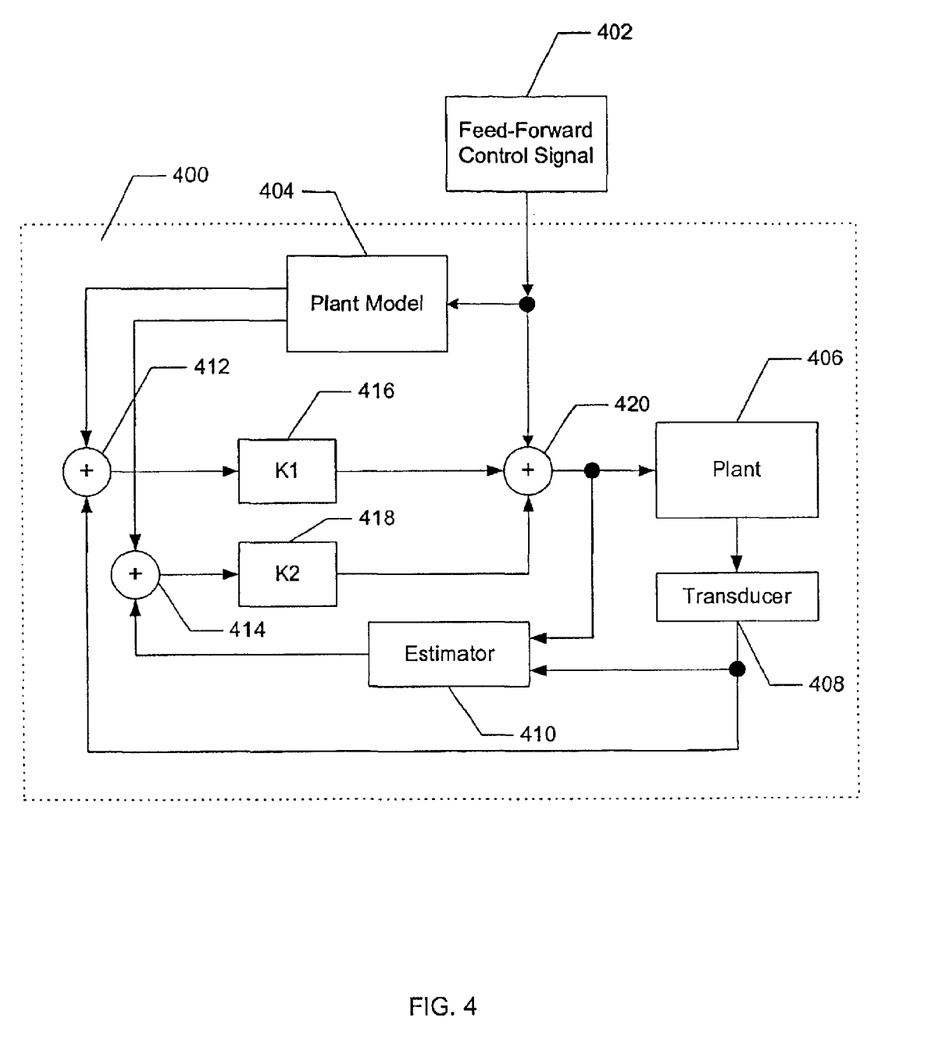
FIG. 4 depicts a feedback loop that is driven by a feed-forward control signal, in accordance with an embodiment of the present invention.

FIG. 4 depicts a feedback loop 400 that is driven by a feed-forward control signal 402. Generally speaking, the feed-forward control signal 402 is used as an input signal, which excites or drives the feedback loop 400. The feedback loop 400 measures/estimates the response of the actuator arm 114 and compares the measured/estimated arm response to the expected arm response (i.e., the position trajectory or velocity trajectory). The difference between the measured/estimated response and the expected response is referred to as an error signal (e.g., a position error signal or a velocity error signal). The feedback loop 400 functions so as to drive the error signals to zero. Thus, when driven by the sinusoid 300 of FIG. 3, the feedback loop 400 functions so as to ensure that the actuatuor arm 114 responds approximately as shown by the velocity and position lines 306 and 308 shown in FIG. 3.

Described with more particularity, the feedback loop 400 functions as follows. Initially, the feed-forward control signal 402 is fed to a plant model 404 and to the plant, itself 406. The term "plant" is used to refer to the actuator arm 114 and its attached coil 126, which is immersed in the magnetic field established by the one or more permanent magnets 128. By virtue of being driven by the feedforward signal 402, the actuator arm 114 and its attached read head 118 are accelerated. The actual position of the read head 118 is measured by a transducer 408. The measured head position is fed to an estimator 410, which also receives a sampling of the present current being used to drive the servomotor 126. Based upon these two inputs, the estimator 410 generates an estimate of head velocity (the estimator 410 uses a sampling of the present current driving the servomotor 126 to remove the phase lag which would result if head velocity were calculated as a simple backwards derivative of head position).

As stated earlier, the feedforward control signal 402 is fed to a plant model 404. The plant model 404 yields estimates of the plant 406 response to the feed-forward signal 402, based on the assumption that the plant 406 responds in an ideal manner. The plant model 404 produces an estimate of head position and head velocity.

A first summer 412 receives: (1) the measured head position from the transducer 408; and (2) the expected head position (or position trajectory) from the plant model 404. The first summer 412 yields the difference between its two inputs, meaning that it produces a position error signal. Similarly, a second summer 414 receives: (1) the estimated head velocity from the estimator 410; and (2) the expected head velocity (or velocity trajectory) from the plant model 404. The second summer 414 yields the difference between its two inputs, meaning that it produces a velocity error signal.

The position error signal generated by the first summer 412 and the velocity error signal generated by the second summer 414 are fed to a first compensator 416 and a second compensator 418, respectively. Each compensator 416 and 418 multiplies its resepctive error signal by a gain factor, and feeds its respective product to a third summer 420. The third summer 420 also receives the feed-forward signal 402 as an input; it uses the products from the first and second compensators 416 and 418 to adjust the feed-forward signal 402 to account for differences between the ideal and actual responses of the plant 406 (i.e., the feed-forward control signal 402 is adjusted so as to drive the error signals generated by the first and second summers 412 and 414 toward zero). The output from the third summer 420 is, in turn, used to drive or excite the plant 406, thereby closing the feedback loop 400.

The feed-forward control signal 402 used to drive the feedback loop 400 is the sinusoid 300 depicted in FIG. 3. Two variables should be known to define the sinusoid 300: amplitude, A, and period, $t_f$. As can be seen from equations 7 and 8, the amplitude and period of the sinusoid may be arrived at based upon: (1) the seek length, X, and (2) the chosen acoustic factor, C. Thus, by using the sinusiod 300 of FIG. 3 to drive the feedback loop 400 of FIG. 4, selection of an acoustic factor C results in: (1) an amplitude, A, for a given seek length X; (2) a period, $t_f$, for a given seek length X; and (3) a maximum value of the first derivative of the feedforward signal 402, as is indicated by equation 6.

From the preceding discussion, it follows that implementation of the feedback loop 400 combined with the sinusoidal feed-forward signal 300 effectively accomplishes the desired result of limiting the noise level of a seek function based upon a selected acoustic factor, C. The feed-forward signal 402, plant model 404, first summer 412, second summer 414, first compensator 416, second compensator 418, and third summer 420 may be implemented by an embedded microprocessor 142 executing a set of instructions stored in a memory element 143. The transducer 408 and estimator 410 may be implemented as subcircuits of the servo control circuit 150, and are known in the art.

If the feed-forward signal 402 is implemented in firmware, the individual data points making up the sinusoid 300 may be calculated based upon the amplitude of the sinusoid, A, and the period of the sinusoid $t_f$ (by using equation 1, and "plugging in" consecutive incremental time values for t). Alternatively, the individual data points may be stored in a table in memory element 143. Thus, by using $2\pi t/t_f$ as an index variable, a data point may be retrieved from the table, obviating the need to calculate the data points in real time. The retrieved data point may be scaled by the amplitude, A, in real time. Regardless of whether the individual data points are calculated or retrieved from a table, the amplitude, A, and the period, $t_f$, are determined prior to generation of the feed-forward control signal 402. As can be seen from equation 8, the period, $t_f$, may be determined based upon the ratio between the seek length and the acoustic factor (X/C). As with the individual data points making up the feed forward control signal 402, $t_f$ may be arrived at by calculation at the time of executing the seek operation. Alternatively, $t_f$ may be retrieved $t_f$ from a table stored in memory element 143, using the ratio X/C as an index variable. After determination of the period, $t_f$, the amplitude of the sinusoid 300 may be calculated based upon equation 7.

If the plant model 404 is implemented in firmware, it may calculate the velocity trajectory and position trajectory based upon equations 2 and 5, respectively. It is worthy of note that both velocity trajectory and position trajectory are sinusoidal in nature. Consequently, the sinusoidal component of the respective trajectories may be retrieved (rather than calculated in real time), using the same sine table utilized for generation of the feed-forward control signal 402; the scale of the sinusoidal trajectories may be generated by multiplication in real time.

In one embodiment, the plant model 404 is implemented in firmware as described above, with the following alteration: the model 404 accounts for code delay. (There is a phase lag between the trajectory calculations performed by the microprocessor 142 and the current being used to drive the servomotor 126, because the microprocessor 142 consumes time in performing its steps). The code delay is represented by λ. The velocity and position trajectories may be adjusted for code delay, as described below in euqations 9 and 10.

$$v_{traj}(t-\lambda)=v(t)-\lambda[A\sin(2\pi t/t_f)] \quad (9)$$

where $v_{traj}(t-\lambda)$ represents the velocity trajectory adjusted for code delay, λ.

$$x_{traj}(t-\lambda)=xtraj(t)+\lambda v(t) \quad (10)$$

where $x_{traj}(t-\lambda)$ represents the position velocity adjusted for code delay, λ.

Whether or not the plant model 404 accounts for code delay, its output is added to the velocity and trajectory errors (after they have been multiplied by their gain factors via the compensator functions 416 and 418). The result is then converted into an electrical current, which is used to excite the servomotor 126. The process of converting the digital quantity into an electrical current is known in the art, and may involve a digital-to-analog converter, a transconductance amplifier, and other signal conditioning circuitry.

Figure 5:
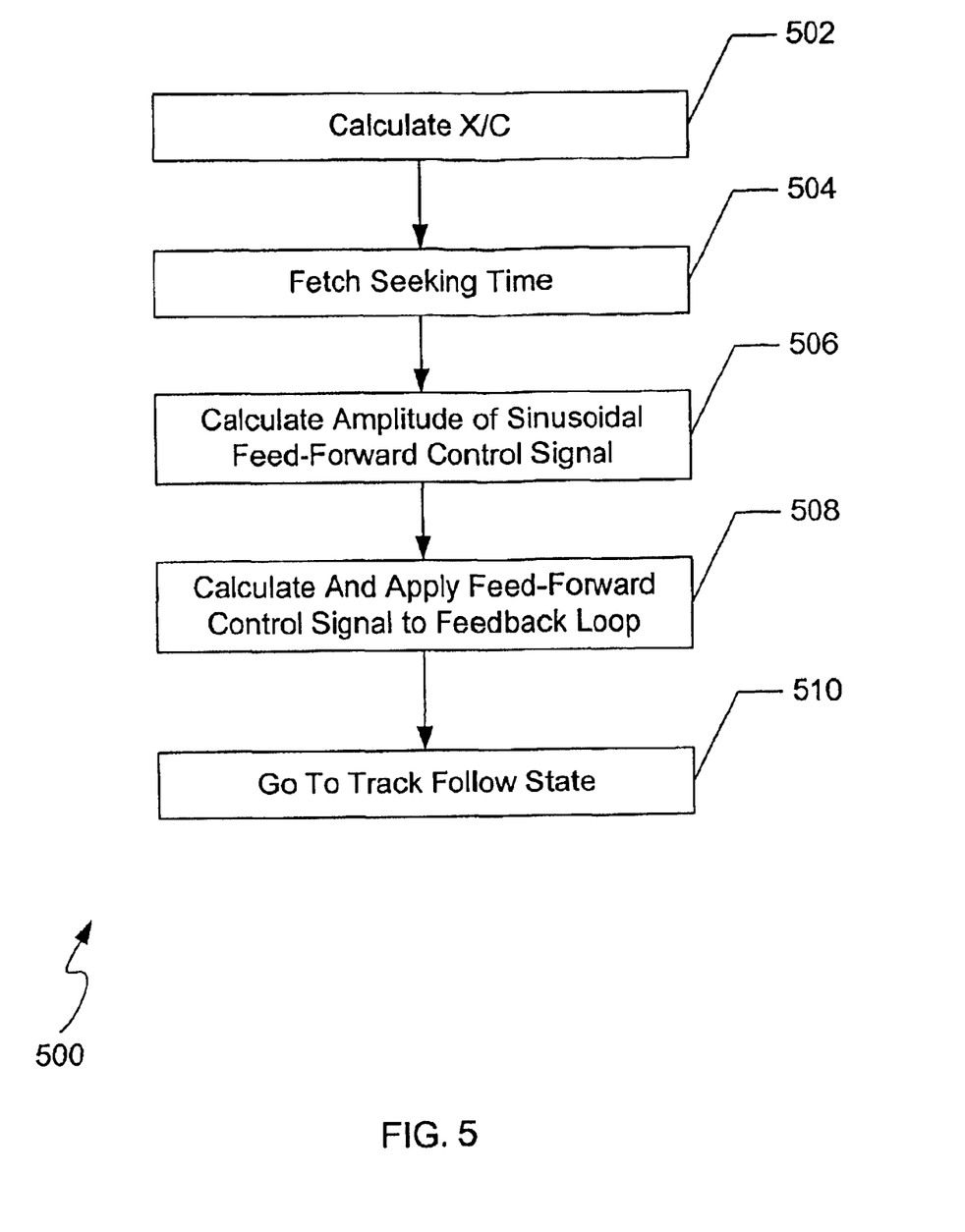
FIG. 5 depicts a method by which a seek operation may be executed, so as to utilize the acoustic factor, in accordance with an embodiment of the present invention.

FIG. 5 depicts a method 500 by which a seek operation may be executed, so as to utilize the acoustic factor. Before a seek operation 500, the acoustic factor is selected by the host user or an application program via the drive interface. The seek length, X, is calculated from the present track position and the target track position, which is one of the parameters of the seeking command. As shown in operation 502, the seek operation commences with a calculation of the ratio between the seek length, X, and the acoustic factor, C. Using the ratio calculated in operation 502, the period, $t_f$, of the sinusoidal feed-forward signal 402 is determined in step 504.

The period, $t_f$, may be calculated in real time (via equation 8), or may be fetched from a table, as described above in reference to FIG. 4. Next in operation 506, the amplitude, A, of the sinusoidal feed-forward signal 402 is determined. The amplitude, A, may be calculated in real time via equation 7.

Next, in operation 508, the sinusoidal feed-forward control signal 402 is calculated, on a data point-by-data point basis. The calculated data points are applied to a feedback loop (such as 400), thereby driving/exciting the loop. By virtue of applying the sinusoidal feed-forward signal 402 to a feedback loop, an iterative process is instantiated, in which the servomotor is excited, its reaction measured/estimated and compared against trajectory values, and resulting error values are used to adjust the current exciting the servomotor. At the end of the cyclical process, the head 118 will come to rest over its target track. Thereafter, the disc drive transitions into a track-follow state, as shown in operation 510.

Figure 6:
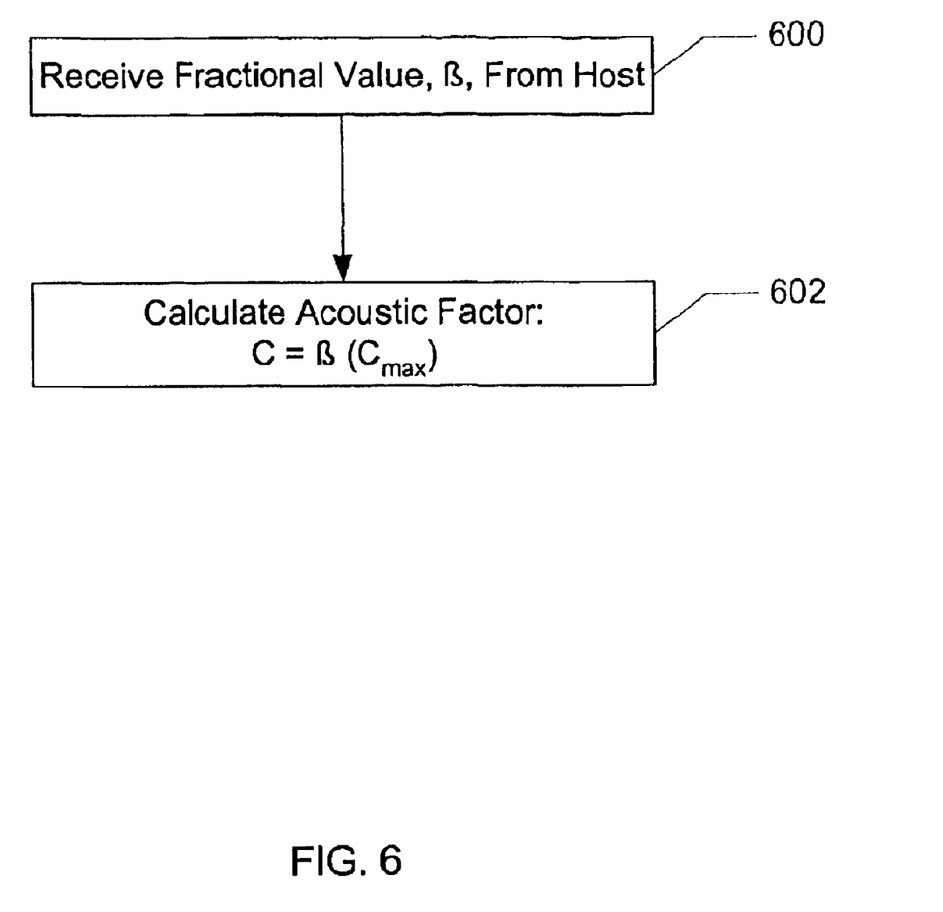
FIG. 6 depicts a method by which a host computer may select an acoustic factor, which controls the acoustic level of the disc drive residing in the host, in accordance with an embodiment of the present invention.

FIG. 6 depicts one scheme by which a host computer may select an acoustic factor, C, which controls the acoustic level of the disc drive residing in the host. As can be seen from FIG. 6, the host computer is permitted to select a fractional value, $\beta$, between 0 and 1. The fractional value, $\beta$, is received in operation 600. Next, in operation 602, the fractional value, $\beta$, is multiplied by a maximum value acoustic factor, $C_{max}$. The maximum acoustic value, $C_{max}$, represents the greatest level of seek performance to which the drive may be set, and may vary from disc drive to disc drive. The resulting product is the acoustic factor, C, used by the disc drive:

$$C=\beta(C_{max}) \quad (11)$$

The acoustic factor, C, is subsequently used, as described with reference to the preceding methods and apparatuses.

To summarize, a method of controlling acoustic noise generated by a seek operation in a disc drive may be realized by using a feedback control system to control the seek operation. The feedback control system is excited by a feed-forward signal during execution of the seek operation (such as in operation 508). Next, an acoustic factor, which defines a seek operation noise level, is selected (such as in operation 600). The feed-forward signal is generated based, at least in part, upon the selected acoustic factor (such as in operations 502, 504, and 506). The feed-forward signal has a first derivative having a maximum value. The selected acoustic factor is used to select the maximum value of the first derivative of the feed-forward signal.

Optionally, the feed-forward signal may be a sinusoid (such as in sinusoidal feed-forward signal 300). Further, the feed-forward signal may be one period of a sinusoid (such as in sinusoidal feed-forward signal 300). Such a sinusoid has an amplitude, and the amplitude and period of the sinusoidal feed-forward control signal are determined based at least in part upon length of the seek operation and the selected acoustic factor. The period of such a sinusoid may be represented by $t_f=(X/C)^{1/3}*(2\pi)^{2/3}$, where the length of the seek operation is represented by X, and the acoustic factor is represented by C. The amplitude of such a sinusoid may be represented by $A=(C^*t_f)/(2\pi)$.

A system for controlling acoustic noise generated by a seek operation in a disc drive may include a feedback control loop (such as control loop 400) controlling the seek operation with a feed-forward control signal (such as feed-forward signal 402) during the seek operation. The system also includes a microprocessor (such as microprocessor 142) programmed to receive a selection signal for selecting an acoustic factor for a seek operation noise level. Further, the microprocessor (such as microprocessor 142) is programmed to generate the feed-forward control signal based, at least in part, upon the selected acoustic factor. The selected acoustic factor is used to select the maximum value of the first derivative of the feed-forward signal. The feedback control loop employs a velocity trajectory that is represented by $v_{traj}=(A\ t_f)/2\pi[1-\sin(2\pi(t/t_f+\frac{1}{4}))]$. The system may also employ a position trajectory that is represented by $X_{traj}=At_f^2/2\pi-(At_f/2\pi)t+(At_f^2/4\pi^2)\sin(2\pi t/t_f)$. The feedback control loop may drive a position error signal representing a difference between a measured head position and a desired head position to obtain a zero position error signal. Further, the feedback control loop may drive a velocity error signal representing a difference between an esitmated head velocity and a desired head velocity to obtain a zero velocity error signal. Optionally, the microprocessor may be farther programmed to adjust the desired head velocity and the desired head position for code delay. The desired head velocity may be adjusted based on the integral of the feed-forward signal minus the code delay multiplied by the feed-forward signal. The desired head position may be adjusted based on the seek length minus the integral of the integral of the feed-forward control signal added to the code delay multiplied by the integral of the feed-forward signal.

A disc drive may include a magnetically encodable disc (such as disc 108) for storing data on data tracks written on the disc. The disc drive may further include a magnetically sensitive transducer (such as transducer 118) for reading data from the disc, the magnetically sensitive transducer being carried by an actuator arm (such as arm 114) that moves the transducer between data tracks. A motor (such as motor 124) may be attached to the actuator arm for propelling the actuator arm when driven with an electrical current. Finally, a microprocessor (such as 142) may be programmed to execute the above-summarized methods.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, a feed-forward control signal other than a sinusoid may be used along with an appropriate set of equations designed to limit the first derivative of the feed-forward signal, based upon an acoustic factor. Additionally, other derivatives may be limited based upon an acoustic factor (e.g., a second or third derivative may also be limited). Furthermore, other hardware arrangements may be used to implement the control system depicted herein. Numerous other changes may be made which will readily suggest themselves to those skilled in the art and which are encompassed in the invention disclosed and as defined in the appended claims.

What is claimed is:

1. A method of controlling acoustic noise generated by a seek operation in a disc drive, the method comprising:
   selecting an acoustic factor for a seek operation noise level;
   generating a feed-forward signal based, at least In part, upon the selected acoustic factor, wherein the feed-forward signal has a first derivative having a maximum value, and the selected acoustic factor is used to select the maximum value of the first derivative of the feed-forward signal; and
   controlling the seek operation with a feed-forward signal during execution of the seek operation.

2. The method of claim 1, where in the feed-forward signal a signal is sinusoid.

3. The method of claim 2, wherein
   the feed-forward signal is one period of a sinusoid; and
   the sinusoid has an amplitude, and the amplitude and period of the sinusoidal feed-forward control signal are determined based at least in part upon length of the seek operation and the selected acoustic factor.

4. The method of claim 3, wherein the period of the sinusoid is represented by $t_f=(X/C)^{1/3}*(2\pi)^{2/3}$, where:
the length of the seek operation is represented by X; and
the acoustic factor is represented by C.

5. The method of claim 4, wherein the amplitude of the sinusoid is represented by $A=(C*t_f)/(2\pi)$.

6. The method of claim 5, wherein the feedback control loop employs a velocity trajectory that is represented by $v_{traj}(A\, t_f)/2\pi[1-\sin(2\pi(t/t_f+\frac{1}{4}))]$.

7. The method of claim 6, wherein the feedback control loop employs a position trajectory that is represented by $X_{traj}=At_f^2/2\pi-(At_f/2\pi)t+(At_f^2/4\pi^2)\sin(2\pi t/t^f)$.

8. The method of claim 1, wherein
a position error signal representing a difference between a measured head position and a desired head position is driven toward zero; and
a velocity error signal representing a difference between a head velocity and a desired head velocity is driven toward zero.

9. The method of claim 8, wherein the desired head velocity and the desired head position are adjusted for code delay.

10. The method of claim 9, wherein the adjusted desired head velocity is the integral of the feed-forward signal minus the code delay multiplied by the feed-forward signal.

11. The method of claim 9, wherein the adjusted desired head position is the seek length minus the integral of the feed-forward control signal added to the code delay multiplied by the integral of the feed-forward signal.

* * * * *